INVENTORS.
Guy D. Pierce
Rudi K. Runtt
BY Harness, Dickey & Pierce
ATTORNEYS.

United States Patent Office 3,361,250
Patented Jan. 2, 1968

3,361,250
MECHANICAL TRANSFER
Guy Donald Pierce, Birmingham, Mich., and Rudi K. Runft, Windsor, Ontario, Canada, assignors to The Cross Company, Fraser, Mich., a corporation of Michigan
Filed Mar. 9, 1966, Ser. No. 532,967
13 Claims. (Cl. 198—221)

This invention relates generally to transfer devices, and particularly to an improved mechanical workpiece transfer device.

The transfer device of the present invention is particularly useful in transferring workpieces step-by-step through a series of work and/or idle stations where workpieces are automatically machined or assembled or otherwise processed or acted upon. A typical environment for the transfer device of this invention is a machine tool for automatically machining engine blocks where rough engine block castings are delivered to a loading station at one end of the machine and are transferred automatically through the machine step-by-step from one station to another and where typical milling drilling, boring, tapping, chamfering and other operations are performed thereon and wherein the finished block is taken from an unloading station at the other end of the machine.

In some machines of this type, a unitary transfer device extending substantially the full length of the machine is used to transfer the workpieces through all the machine stations. In other longer machines as well as those operating on relatively heavy workpieces and where the transfer sequence at one series of stations differs from that at other stations, several mechanically or electrically interconnected tandem arranged transfer devices may be used. Invariably, however, one transfer device is used to serve a plurality of work stations and because of the high speed production requirements of machines of this type and of the heavy weight of the transfer devices and workpieces being transferred, there exists the problem of correspondingly high inertia forces arising during workpiece acceleration, deceleration and stopping in each cycle of the transfer mechanism.

Furthermore, if the workpieces are to be accurately machined, it is necessary that they be accurately positioned at each work station. Machines of the type described generally are provided with clamp devices actuated at the end of each transfer cycle to hold the workpieces during the machine operations and these clamp devices often are constructed to correct reltively small misalignments which might exist between the workpiece and the machining tool or tools. However, the extent of misalignment that can be corrected by these clamp devices is limited so that it is necessary that the transfer bar device be capable of stopping in relatively accurate relation to the work stations. This is made increasingly difficult and the iertia force problem referred to above is made more apparent when considering that high production standards in machines of this type as set out above make it necessary to move the transfer bar device and the workpieces at as high a rate of speed as possible between stations.

In the past, cycling of the transfer bar devices has been effected generally by various hydraulically operated reciprocating mechanisms which drive the transfer bar devices at a high rate of speed through the initial portion of the transfer cycle until the transfer bar devices approach the end of their stroke where, by suitable control mechanisms, the hydraulic mechanism is slowed and then stopped. Because of the linear nature of this type of reciprocating motion, the inertia forces arising from acceleration, deceleration and accurately stopping the transfer bar devices and the workpiece carried thereby are high and impose severe strains on the moving parts. Thus, a need exists for an improved transfer device capable of rapidly and accurately transferring workpieces in step-by-step fashion through a series of stations without the normally severe inertia strains being imposed on the moving parts.

Important objects of the present invention, therefore, are to provide an improved mechanical transfer device capable of both rapid and accurate transfer of workpieces and one which minimizes the inertia forces arising therein.

Additional objects include a transfer device of the above character which is adapted for use with a variety of transfer bar devices constructions and simultaneously with two or more transfer bars having similar or different cycle paths.

Further objects include a transfer device of the above character which is relatively inexpensive to manufacture, durable in construction and reliable in use.

Other objects and advantages of the present invention will become more apparent from a consideration of the following detailed description taken in conjunction with the drawings in which:

FIG. 3 is a diminished plan view of FIG. 2 with some parts thereof omitted for clarity;

FIG. 5 is a sectional view of FIG. 4 taken along the line 5—5 thereof;

FIG. 11 is a plan view, similar to FIG. 4, illustrating a modified form of the present invention;

FIG. 12 is a sectional view of FIG. 11 taken along the line 12—12 thereof;

FIG. 13 is a side elevational view of a portion of FIG. 11 looking in the direction of the arrow "13";

FIG. 14 is a side elevational view illustrating a typical work station using the form of the invention embodied in FIGS. 11–13;

FIG. 16 is a schematic wiring diagram illustrating the controls for the embodiment of the invention disclosed in FIGS. 1–10;

Broadly described, the present invention includes arm means pivotally mounted at one end for movement about a first axis, transfer bar means slidably disposed for longitudinal reciprocating movement normal to said first axis and adapted to transfer workpieces associated therewith in one longitudinal direction of movement, means pivotally and slidably interconnecting said arm means and said transfer bar means, rotating drive means interconnected with said arm means by crank means for pivoting said arm means whereby said transfer bar means is reciprocated in substantially simple harmonic motion to effect smooth and rapid transfer of workpieces associated therewith and accurate positioning thereof at the end of said one longitudinal direction of movement of said transfer bar means.

Figure 1:
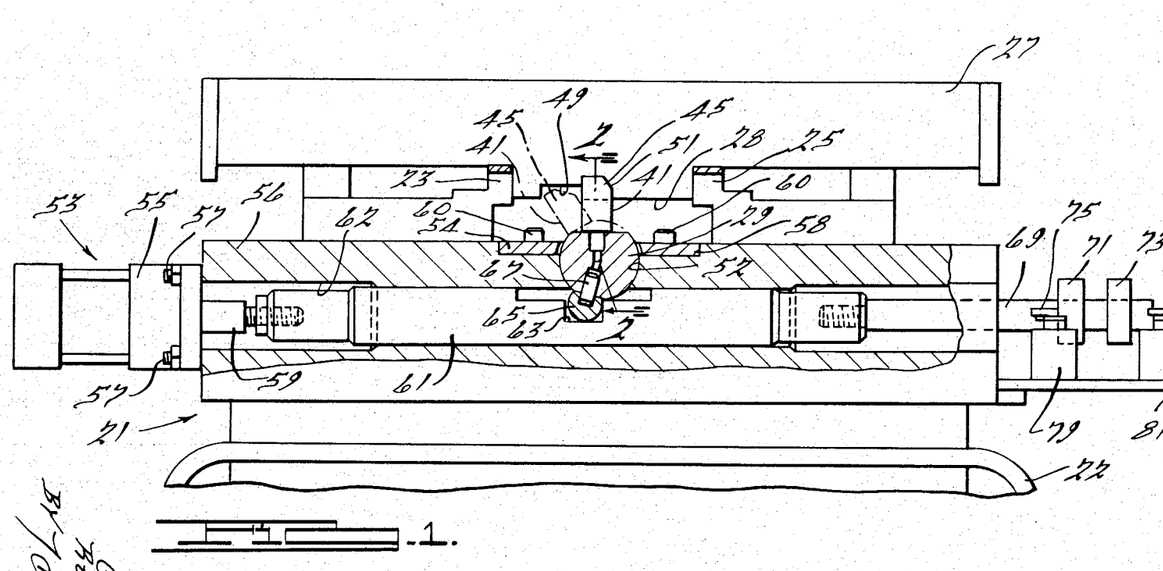
FIGURE 1 is an elevational view, partly in section, illustrating a transfer mechanism embodying the present invention.
Figure 2:
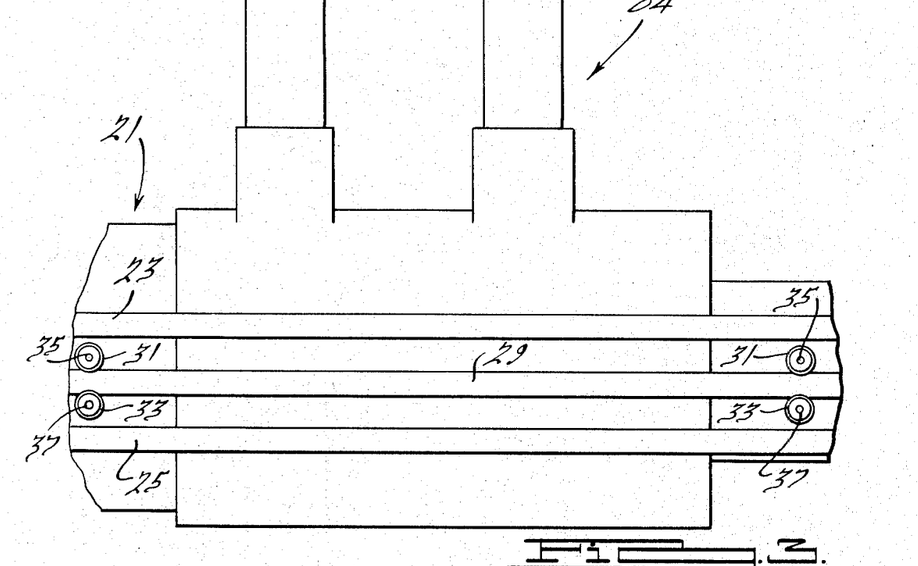
FIG. 2 is a sectional view of FIG. 1 taken along the line 2—2 thereof.

Referring now more particularly to the drawings, FIGS. 1–3 illustrate a transfer mechanism for automatically moving workpieces, for example, through a series of longitudinally spaced work stations in step-by-step fashion. The illustrated mechanism includes a table frame indicated generally at 21 having a plurality of inverted U-shaped supporting legs 22 at longitudinally spaced locations therealong and laterally spaced longitudinally extending guide rails 23, 25 rigidly fixed thereto at the upper portion thereof. A plurality of workpiece supporting pallets 27 (only one of which is shown) is slidably supported on the guide rails 23, 25 being provided with a downwardly depending tongue 28 positioned between the rails 23, 25. The pallets 27, each of which is adapted to have a workpiece (not shown) supported thereon, are suitably delivered to the guide rails 23, 25 adjacent the rear end thereof and are moved longitudinally thereof, in intermittent fashion by longitudinal reciprocation of a transfer bar 29 positioned intermediate the guide rails 23, 25. The transfer bar 29 is slidably supported intermediate its length by opposed pairs of contoured bearing rollers 31, 33 rotatably supported on the table frame 21 by pins 35, 37.

The transfer bar 29 is provided with a plurality of flattened recesses 39 spaced longitudinally therealong, each of which is adapted to receive a pallet feed dog 41 secured therein by screws 43. Each of the dogs 41 has one or more upstanding lugs 45 adapted to be received in suitably formed transverse slots 47 formed in the underside of the pallet tongues 28. In use, the transfer bar 29 is oscillated to move the dog lugs 45 from a lateral inactive position illustrated in dot-dash lines in FIG. 2 to a generally upstanding position shown in full lines therein to alternately feed and release the pallet 27 and is longitudinally reciprocated to transfer the pallets 27 along the guide rails 23, 25. Manifestly, the lugs 45 are positioned as shown in full lines during the forward or feed stroke of the transfer bar 29 and as shown in dot-dash lines during the rearward or return stroke thereof. If desired, the tongue 28 may have a longitudinal slot 49 along its underside adjacent the transverse slots 47 and the lugs gitudinally spaced work stations in step-by-step fashion. 45 may be flattened as at 51 to reduce the extent to which the feed bar 29 need be oscillated to withdraw the lugs 45 to an inactive position.

The transfer bar 29 is controllably oscillated by means of a hydraulic motor 53 (FIG. 1) including a cylinder 55 fixed to a base 56 on the table frame 21 by screws 57 and having a piston rod 59 movable relative to the cylinder 55 in response to pressure fluid supplied thereto by conventional means (not shown). The base 56 may be centrally apertured as at 52 to receive and support the transfer bar 29 and is provided with bearing wedges 54, 58 fixed thereto by screws 60 to retain the transfer bar 29 within the apertures 52 and permit free longitudinal and oscillating movement relative thereto. The outer end of the piston rod 59 is threadedly interconnected with one end of a cross slide 61 movable within an aperture 62 in the base 56 and beneath the transfer bar 29 and transversely thereto. The cross slide 61 has an intermediate slot 63 which receives a segmental cylindrical cam 65 fixed to the transfer bar 29 by pins or keys 67 so that upon reciprocation of the piston rod 59, interaction between the cross slide 61 and the cam 65 causes the transfer bar 29 to oscillate about its longitudinal axis. Reciprocation of the piston rod 59 and cross slide 61 can be controlled by a rod 69 threadedly interconnected with the other end of the cross slide 61 and provided with a pair of trip dogs 71, 73 positioned to engage a pair of trip arms 75, 77 of limit switches 79, 81, respectively. These switches 79, 81 together and in sequence with other control components, control the directional flow of fluid pressure to the cylinder 55 as will be described.

The transfer bar 29 is longitudinally reciprocated by a novel mechanical drive means connected thereto by a transfer block 83 slidably disposed between the guide rails 23, 25 as shown in FIG. 1, and this reciprocation is timed with operation of the motor 53 to effect transfer of the pallets 27 and the workpieces thereon during the forward or transfer stroke and to release the pallets on the return stroke. The length of the forward or transfer stroke is determined by the distance between work stations which may be located between adjacent pairs of the legs 22, one work station being shown generally at 84 in FIG. 3. The block 83 and the mechanical drive means therefor are shown in greater detail in FIGS. 4–10 and reference will be made thereto for a description thereof.

Figure 4:
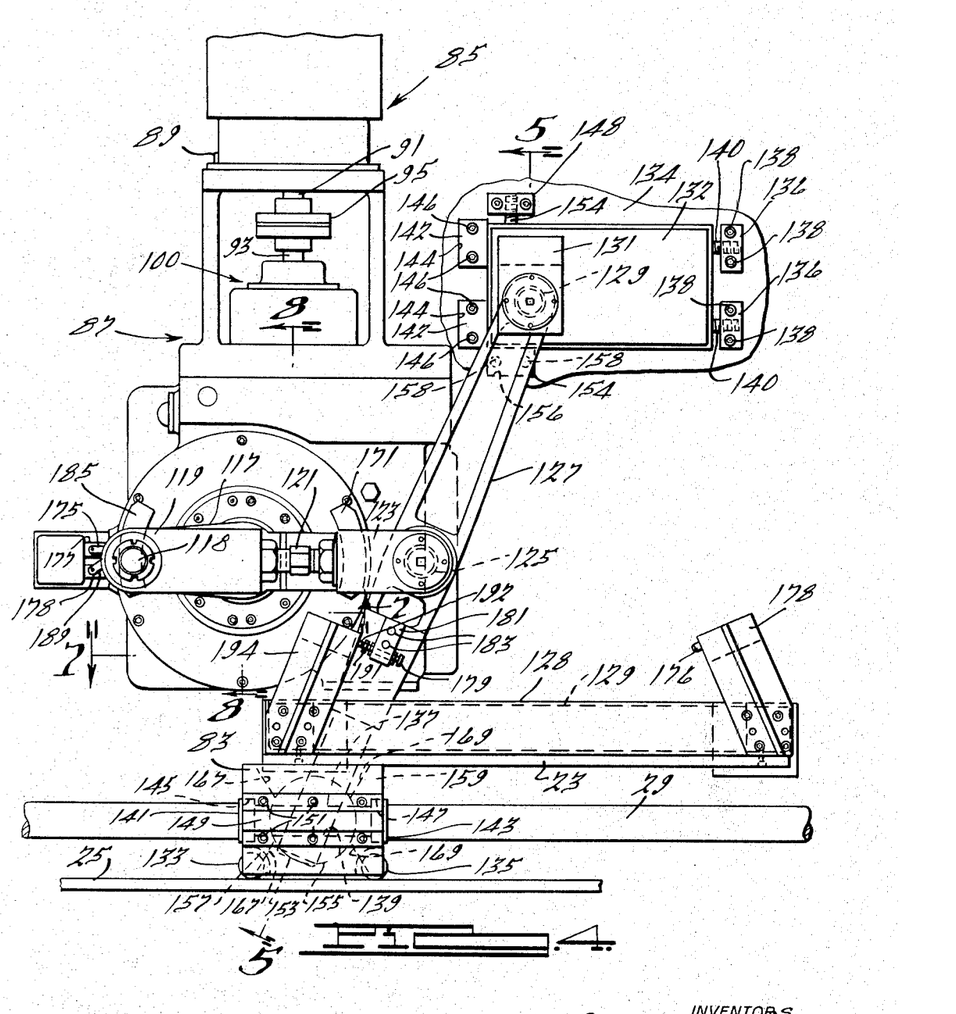
FIG. 4 is a top plan view illustrating one form of transfer bar mechanical drive mechanism embodying the present invention.
Figure 7:
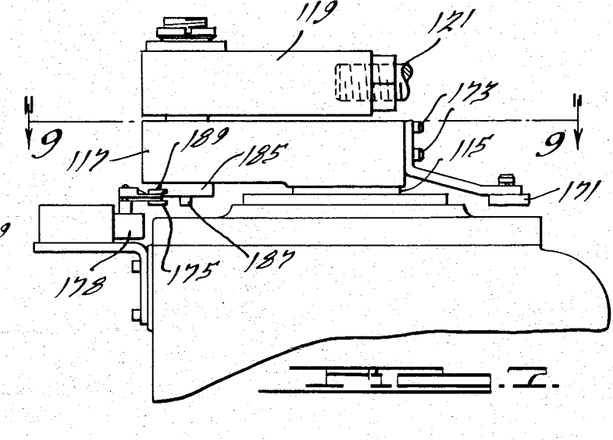
FIG. 7 is a sectional view of FIG. 4 taken along the line 7—7 thereof.
Figure 8:
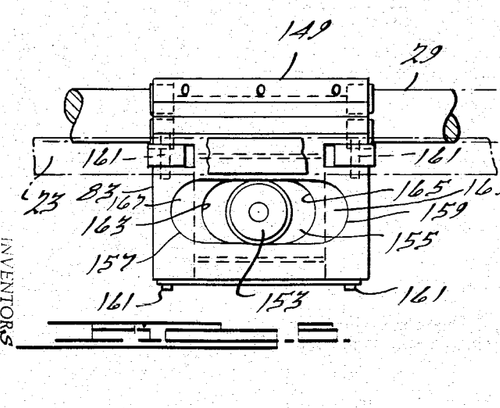
FIG. 8 is a sectional view of FIG. 4 taken along the line 8—8 thereof.
Figure 10:
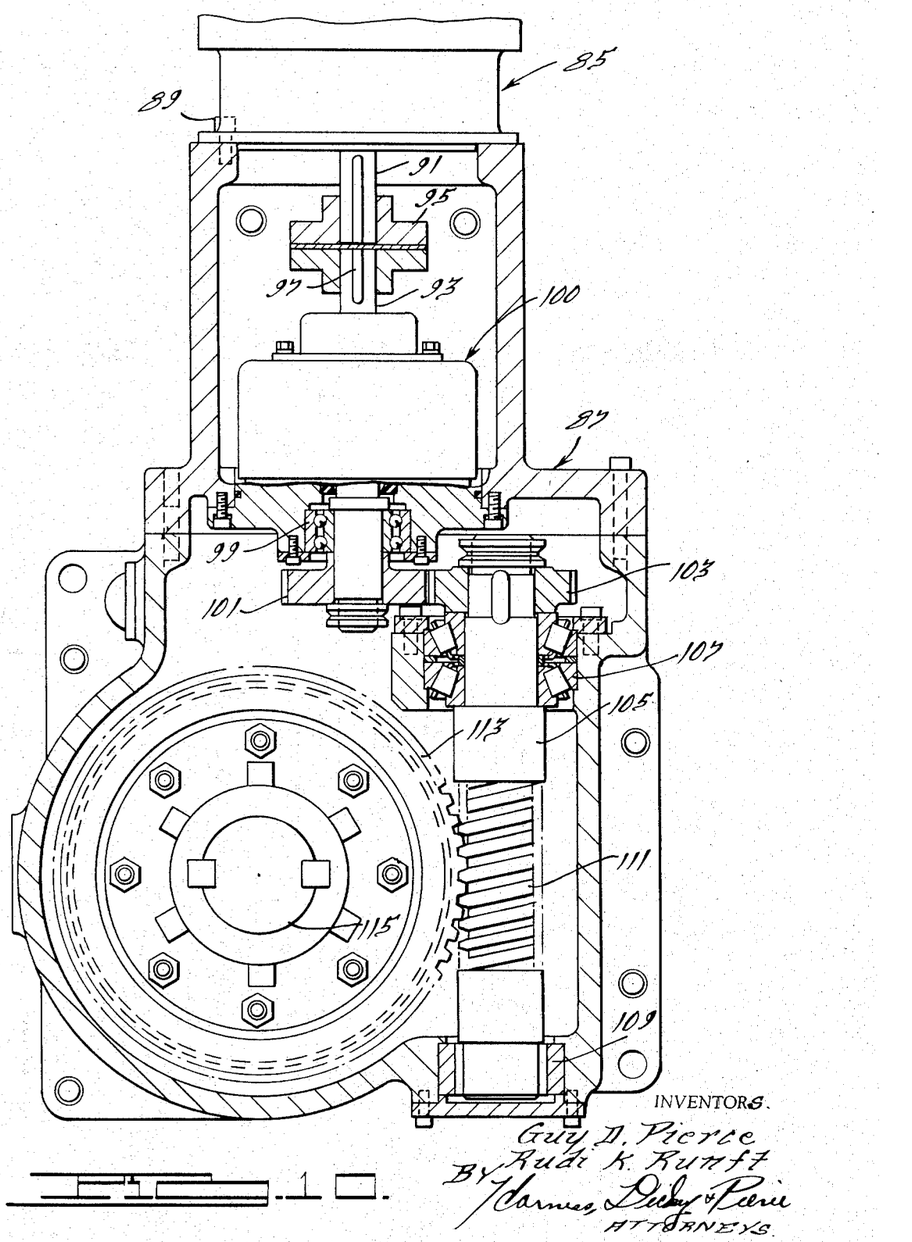
FIG. 10 is a sectional view of FIG. 8 taken along the line 10—10 thereof.

Thus, a conventional two-speed, preferably reversible, electric drive motor 85 is fixed to a drive transmission housing 87 by screws 89 and has an output shaft 91 extending into the housing 87 and connected to one end of a reducer input shaft 93 by a coupling 95 and keys 97 (FIG. 10). An intermediate portion of the input shaft 93 has a conventional, solenoid released brake 100 in surrounding relation thereto and is supported by a bearing 99 within a cover plate 98 fixed to the housing 87 and has a pinion 101 keyed thereto at its other end which drivingly engages another gear 103 fixed to one end of a shaft 105 (FIG. 10). Spaced bearings 107, 109 support the shaft 105 which has a worm 111 fixed thereto drivingly engaging a worm wheel 113 keyed to an output shaft 115 supported by spaced bearings 114, 116 (FIG. 8). The output shaft 115 is disposed normally to the shaft 105 and extends outwardly of the housing 87 and has a crank 117 fixed thereto for rotation therewith (FIGS. 4 and 7). The crank 117 is pivotally connected at one end by a pin 118 to one end of a link 119, the other end of which is adjustably secured by a turnbuckle 121 to a clevis 123. See FIG. 4. A pivot pin 125 interconnects the clevis 123 and a transfer arm 127 at an intermediate point thereof. Suitable bushings and bushing retainers may be provided for each of the pivot connections as is customary in the art.

The transfer arm 127 is pivotally supported at one end by a pivot pin 129 within a mounting bracket 131 fixed to a rectangular stand 132 seated on an extension 134 of the table frame 21. A pair of positioning blocks 136 are secured by screws 138 to the table extension 134 and each has a set screw 140 threadedly positioned therein to engage one end of the stand 132. The other end of the stand 132 abuts a pair of keys 142 which are seated in slots 144 in the frame extension 134 and secured by screws 146. Similarly, a positioning block 148 is secured by screws 150 to the frame extension 134 and has a set screw 152 positioned to engage one side of the stand 132. The other side of the stand 132 engages a key 154 seated in a slot 156 and secured by screws 158. Thus, by replacing the keys 142 with differently sized keys and adjusting the set screws 140, the position of the stand 132 is adjusted longitudinally on the frame extension 134 and by replacing the key 154 and adjusting the set screws 152, the position of the stand 132 is adjusted laterally. The other end of the transfer arm 127 is pivotally and slidably interconnected with the sliding transfer block 83. A support bracket 124, fixed to the frame 21, has an elongated support leg 126 fixed at the top thereof. A wear-resistant, preferably bronze, plate 128 is fixed atop the support leg 126 and slidably supports the transfer arm 127 adjacent the block 83.

Figure 6:
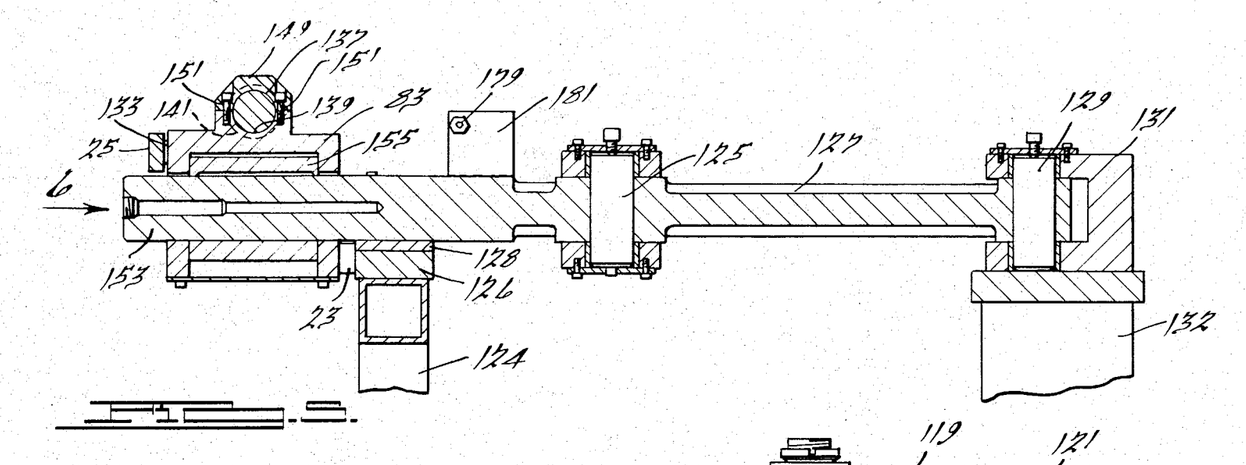
FIG. 6 is an end view of FIG. 5 looking in the direction of the arrow "6"

When the electric motor 85 is energized and the brake 100 released, the output shaft 91 is caused to rotate, which, through the described transmission turns the output shaft 115. The crank 117 turns with the shaft 115 and through the link 119, the turnbuckle 121 and the clevis 123 causes the transfer arm 127 to oscillate about the axis of the pivot pin 129 thereby causing the block 83 to reciprocate between the guide rails 23, 25. As shown in FIGS. 4 and 5, the transfer block 83 slidably engages the guide rail 23 and is provided with a pair of freely rotatable rollers 133, 135 which engage the guide rail 25 so as to permit free sliding movement of the block 83 between the guide rails 23, 25. The transfer bar 29 is secured to the block 83 for longitudinal movement therewith, the transfer bar having a reduced portion 137 positioned in a semicylindrical bearing recess 139, and a pair of collars 141, 143 seated in enlarged semicylindrical bearing recesses 145, 147 formed in the block 83 (FIGS. 4-6). A cap 149 overlies the transfer bar reduced portion 137 and the collars 141, 143 and is secured to the block 83 by screws 151 to hold the transfer bar 29 in place on the block 83 while permitting it to turn therewithin.

To afford the pivotal and slidable connection between the transfer arm 127 and the sliding transfer block 83, the transfer arm 127 has a reduced, generally cylindrical end 153 extending slidably through a cylindrical member 155 which is positioned between a pair of socket-like bearings 157, 159 fixed within the ends of the block 83 by screws 161. Bearings 157, 159 have segmental cylindrical bearing surfaces 163, 165 which receive the cylindrical member 155 for free turning movement about a vertical axis and the bearings are rearwardly tapered at 167, 169, respectively, to provide clearance for the end 153 of the transfer arm 127. Thus, when the transfer arm 127 is oscillated about the axis of the pivot pin 129, the block 83 slides longitudinally between the guide rails 23, 25 with the cylindrical member 155 sliding lengthwise along the transfer arm end 153 and turning within the bearings 157, 159.

The length of the stroke of the transfer block 83 can be adjusted by laterally repositioning the bracket platform 132 on the frame extension 134 as described and the location of the limits of movement of the transfer block can be varied by threaded adjustment of the turnbuckle 121 and/or by longitudinally repositioning the bracket platform 132 on the frame extension 134. Thus, the stroke length and limits of the transfer arm 29 and transfer block 83 can be accurately controlled.

In use, the parts are initially positioned as shown in FIG. 4 and in dot-dash lines in FIG. 1 with the mechanism stopped. The hydraulic motor 53 is first energized to turn the transfer bar 29 and swing the dog lugs 45 upwardly to their operative position where they engage in the transverse slots 47 in the pallets 27. The high speed winding of the motor 85 is then energized and the brake 100 is released either manually or automatically in response to a pallet 27 having a workpiece secured thereon being delivered to the front or leading end of the device or upon completion of one of the forming or machining operations along the table frame 21. The electric motor 85 turns the crank 119 causing the transfer arm 127 to swing forwardly or toward the right about the pivot pin 129, as seen in FIG. 4, and the transfer bar 29 is fed forwardly, accordingly, to begin the transfer sequence.

As shown in FIG. 4, the crank 117 is initially in a dead-center position so that the initial movement of the transfer bar 29 is relatively slow even though the high speed winding of the motor 83 is energized. However, as the crank 117 moves away from dead center, movement rate of the transfer arm 127 and the transfer bar 29 rapidly and smoothly accelerates until it reaches a maximum when the crank 117 has moved 90° from the position shown in FIG. 4. Thereafter, the rate of movement of the transfer arm 127 and transfer bar 29 decelerates in essentially simple harmonic fashion.

Figure 9:
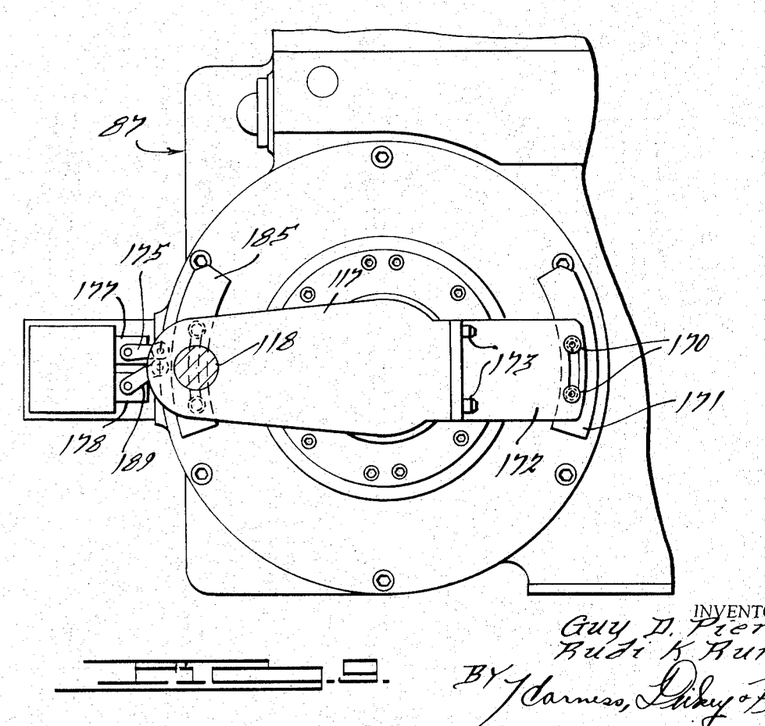
FIG. 9 is a sectional view of FIG. 7 taken along the line 9—9 thereof.

When the crank 117 approaches the dead-center position displaced 180° from the initial position shown in FIGS. 4 and 9, a cam plate 171 adjustably carried through screws 170 by a bracket 172 fixed to the crank 117 by screws 173 engages and pivots an actuator arm 175 of a switch 177 to deenergize the high speed winding of the motor 83 and energize the low speed winding thereof. At this point, the movement of the transfer bar 29 has already been substantially decelerated owing to the harmonic motion of the crank 117 so that any shock resulting on the transfer bar 29 is effectively minimized. When the crank 117 precisely reaches this dead-center position, a sensitive air limit switch 176 fixed to a bracket 178 carried by the plate 126 is tripped by a pin 179 adjustably secured to a bracket 181 fixed to the transfer arm 127 by screws 183. This air switch 176 effects deenergization of the motor 83 and simultaneous application of the brake 100 and brings forward movement of the transfer bar 29 to a halt. Again, since the crank 117 is moving to a dead-center position, the rate of movement of the transfer bar 29 is at a minimum at this point. In addition, the low speed winding of the motor 83 is in operation which, together with the dead-center crank position, insures that stopping of the transfer bar 29 is effected with a minimum of shock. Furthermore, any slight inaccuracies in the actual stopping point of the crank 117 has a negligible effect on the position of the transfer bar 29.

At the same time that the motor 83 is stopped and the brake 100 applied, and if desired, in response to pivotal movement of the switch arm 175, the hydraulic motor 53 is reversed to move the dog lugs 45 to an inactive position as shown in dot-dash lines in FIG. 1. This brings the trip dog 73 into engagement with and pivots the arm 77 of switch 81 which stops the motor 53 and reenergizes the high speed winding of the motor 83 in reverse fashion if the motor 83 is reversible or, in the same direction as in the transfer stroke if this motor is unidirectional to swing the transfer arm 127 to the left as seen in FIG. 4 and this starts the return stroke of the transfer bar 29.

During this return stroke, movement of the transfer bar 29 accelerates to a maximum at the point where the crank 117 is displaced 90° from the position illustrated in FIGS. 4 and 9 which is also displaced 90° from the crank position at the end of the forward stroke. Thereafter, the transfer bar movement decelerates and at a point near the end of the return stroke, a cam plate 185 adjustably fixed to the crank 117 by screws 187 engages and pivots a pivotal arm 189 on a switch 178. This switch 178 also deenergizes the high speed winding of the motor 85 and energizes the low speed winding thereof and prepares the drive and transmission for stopping. Rearward or left-hand directional movement of the transfer arm 127 continues at a greatly reduced rate, owing both to the reduced speed of the motor 85 as well as the fact that the crank 117 is approaching dead center. When the crank 117 reaches dead center, a threadedly adjustable pin 191 carried by the bracket 181 on the transfer arm 127 trips another highly sensitive air switch 192 fixed to a bracket 194 carried on the plate 126 to energize the brake 100 and stop the motor 85. The brake 100 remains applied and the motor 85 remains deenergized until it is desired to perform the next transfer sequence when the parts are cycled in the same manner as described above.

Figure 18:
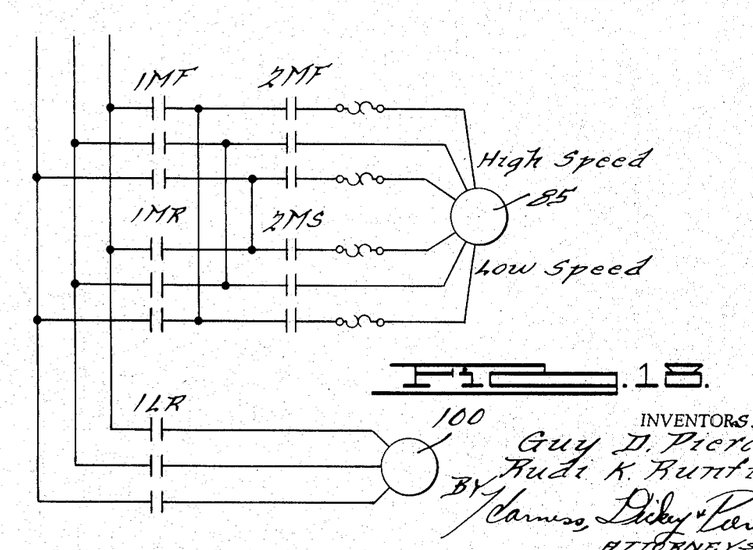
FIG. 18 is a schematic diagram illustrating the drive motor and brake circuit employed with the control circuitry of FIGS. 16 and 17.

FIGURES 16 and 18 schematically illustrate one form of electrical and motor control system adapted to effect sequencing of the transfer mechanism controls disclosed in the embodiment of FIGS. 1-10 and are shown with the parts in the position as seen in FIG. 4 and in dot-dash lines in FIG. 1. The system is turned on by closing the Cycle Contact which could be done either by manually operating a push button or automatically in response to completion of one of the machining or other operations of the device as described above which, in turn, energizes the relay 2CR through the contacts of the relay switches 3RS and 5RS. The contact relay 2CR closes the contact relay switches 2RS energizing 1 solenoid to shift a valve (not shown) controlling the directional flow of fluid to the hydraulic motor 53. The motor 53 moves the cross bar 61 and oscillates the transfer bar 29 bringing the dogs 45 into engagement with the pallet 27. When the dogs 45 are swung into the position shown in full lines in FIG. 2, the switch arm 77 of gang switch 81 is released and switch arm 75 of switch 79 is tripped so that now the high speed starter 1MF is actuated. Starter 1MF energizes the high speed windings of the drive motor 85 and in addition energizes the timer 1TR along with the relay 1CR which effects release of the brake 100. Thus, the transfer bar 29 starts moving forward through the transfer stroke under the influence of the high speed windings of the motor 85. Substantially immediately after the transfer bar 29 starts moving, the gang air limit switch 192 is released to effect deenergization of the relay 5CR and opening of the relay switch 5RS. Continued movement of the transfer bar 29 in the forward direction causes the cam 185 to move out of contact with the switch arm 189 and releases the gang switch 178 and a short time later, the timer 1TR times out.

When the transfer bar 29 approaches the forward limit of the transfer stroke, the cam 171 engages and pivots the switch arm 175 tripping the gang switch 177, which deenergizes the high speed windings of the motor 83 by deenergizing high speed starter 2MF and energizes the slow speed windings of the motor 83 through slow speed starter 2MS thereby causing the rate of movement of the transfer bar 29 in the forward direction to be slowed. The transfer bar 29 continues moving until the gang air switch 176 is tripped by pin 179 thereby deenergizing the starter 1MF, timer 1TR and the relay 1CR. This then effects deenergization of the slow speed windings of the drive motor 83 and through the contact relay 1CR the brake 100 is set and movement of the transfer bar 29 is stopped. In addition, the switch 176 energizes the relay 4CR opening the relay switch 4RS to deenergize the slow starter 2MS and energize the fast starter 2MF to prepare the circuit for the return stroke.

When the contact relay 4CR is energized, it closes the contact relay switch 4RS as described and since the gang switch 81 has already been released, this effects energization of the relay 3CR. When this occurs, the relay switches 3RS are closed to energize 2 solenoid to effect reversal of the valve controlling the directional flow of fluid to the hydraulic motor 53 and therefore movement of the cross bar 61 toward the right, as seen in FIG. 2. This causes the dogs 45 to be disengaged from the pallet 27 whereupon the switch arm 77 of the gang switch 81 is tripped and the contact relay 3CR deenergized.

When the gang switch 81 is tripped, it energizes the transfer return starter 1MR through the contacts of the air switch 192 and the transfer forward starter 1MF. 1MR energizes the high-speed windings of the drive motor 85 in reverse polarity and in addition energizes the timer 1TR and the brake release relay 1CR thereby causing the transfer bar 29 to move in the reverse direction at high speed. As soon as the transfer bar 29 starts moving rearwardly, the gang air switch 176 is released and a short time later, the cam 171 moves out of contact with the switch arm 175 of the gang switch 177 to release it. The transfer bar 29 moves rearwardly toward the initial position and as it approaches this position, the switch arm 189 of the gang switch 178 is engaged and tripped by the cam 185 to effect deenergization of the high-speed starter 2MF and energize the slow-speed windings of the motor 85 through 2MS. When the transfer bar 29 reaches the fully returned position, the gang air switch 192 is tripped to effect deenergization of 1MR, 1TR and 1CR which, in turn, deenergizes the slow-speed windings of the motor 85 and sets the brake 100. The air switch 192 also energizes the relay 5CR and deenergizes the starter 2MS and at the same time energizes the fast starter 2MF to prepare the circuit for the next cycle.

A modified form of the present invention is illustrated in FIGS. 11–15. This form is particularly adapted for use in installations where it is necessary to index workpieces differently through different stations. For example, in some installations, it is necessary that the workpieces be transferred one at a time from one station to the next in one portion of the machine and two at a time through successive, relatively greater spaced stations in another portion of the machine. To preserve the continuous and efficient machine operation, the latter, or so-called longer, transfer device operates only on every other cycle of the short transfer device and moves twice as far.

In addition to the different indexing sequence achieved, this modified form of the present invention is shown as embodying a lift-and-carry type of transfer bar device as distinguished from the oscillating type described for the form illustrated in FIGS. 1–10. However, it is to be understood that either form of transfer bar may be used in either of the embodiments as both transfer bar forms are conventional and form no part of the present invention.

Referring now more particularly to FIGS. 11–14, the drive and transmission mechanism which transmit simple harmonic motion to a pivotally mounted primary transfer arm 201 is substantially identical to that illustrated and described in detail above for the embodiment of FIGS. 1–10. Thus, a detailed description thereof is omitted here and like numerals refer to like parts. The primary transfer arm 201 is pivotally mounted at one end by a pivot pin 203 within a mounting bracket 205 secured to a stand 200 seated on an extension 216 of the table frame (not shown). A pair of positioning blocks 218 are secured by screws 220 to the frame extension 216 and each has a set screw 222 threadedly positioned therein to engage one end of the stand 200. The other end of the stand 200 abuts a pair of keys 224 which are seated in slots 226 in the frame extension 216 and are secured therein by screws 228. Similarly, a positioning block (not shown) is secured to the frame extension 216 and has a set screw 230 positioned to engage one side of the stand 200. The other side of the stand 200 engages a key 232 seated in a slot 234 and secured by screws 236. Thus, by replacing the keys 224 with differently sized keys and adjusting the set screws 222, the position of the stand 200 is adjusted longitudinally on the frame extension 216 and by replacing the key 232 and adjusting the set screw 230, the position of the stand 200 is adjusted laterally.

The transfer arm 201 is pivotally and slidably received at its other end within a transfer block 207. A support bracket 204 is fixedly mounted upon the machine frame (not shown) beneath the transfer arm 201 and has an elongated support leg 206 fixed thereto at the top thereof. Another support bracket 208, also fixed to the machine frame, is positioned above the transfer arm 201 and has an elongated support leg 210 fixed thereto and extending generally parallel to the support leg 206. A pair of wear-resistant, preferably bronze, guide plates 212, 214 are fixed to the support legs 206, 210, respectively, on either side of the transfer arm 201 to slidably guide the transfer arm during oscillating movement thereof.

As shown, the block 207 has at least one, and in this case, a pair of transfer bars 209, 211 secured thereto by screws 213 and is slidably disposed between a pair of guide rails 215, 217 fixedly mounted on the table frame (not shown). One side of the block 207 may have one or more freely turnable rollers 219 engaging the rail 217 while the other side thereof slidably engages the rail 215.

The primary transfer arm 201 is oscillated directly by turning movement of the crank 117 in the same manner as the transfer arm 127 in the embodiment of FIGS. 1–10 and thereby effects reciprocation of the block 207 and the transfer bars 209, 211 along the guide rails 215, 217. The length of the reciprocatory stroke of the transfer bars 209, 211 is a function of the throw of the crank 117 and is effective to index workpiece supporting pallets or the workpieces themselves (not shown) a corresponding distance along the guide rails 215, 217. In this embodiment, the direction of workpiece transfer is from right to left as seen in FIG. 11 rather than from left to right as was the case in FIG. 4 of the previous embodiment. To alternately bring the transfer bars 209, 211 into and out of engagement with the workpieces and effect indexing thereof, the block 207 is selectively movable vertically relative to the guide rails 215, 217 and the transfer arm 201.

As shown in FIGS. 11 and 12, the transfer arm 201 has a substantially cylindrical outer end 221 which is longitudinally slidably disposed within an opening 223 in a cylindrical member 225 rotatably disposed within segmental cylindrical bearing surfaces 227, 229 formed in a pair of socket-like bearings 231, 233. The bearings 231, 233 are fixed within the ends of the block 207 by screws 235 and the segmental cylindrical bearing surfaces 227, 229 are such that the block 207 and the bearings 231, 233 can move vertically relative to the end 221 of the transfer arm 201. The block 207 is provided with vertically elongated slots 237, 239 through which the end 221 of the transfer arm 201 extends to permit the vertical relative movement between the block and transfer arm. In addition, the bearings 231, 233 are rearwardly tapered at their outer ends as shown at 241, 243 to provide sufficient clearance for the end 221 of the transfer arm 201 during oscillatory movement thereof.

The transfer block 207 and the transfer bars 209, 211 interconnected therewith are supported for limited and controlled vertical movement between the guide rails 215, 217. As shown in FIG. 14, an arm 245 is pivotally secured by a pin 247 to a base 249 fixed to the table frame (not shown). The arm 245 is provided with one or more antifriction rollers 251 (only one of which is shown) which engage and support the transfer bars 209, 211. A hydraulic motor 252 is pivotally secured to the base 249 and has a piston rod 253 pivoted at its outer end by a pin 254 to the arm 245. Thus, by reciprocating the piston rod 253 toward the left as viewed in FIG. 14, the arm 245 swings in a counterclockwise direction and the rollers 251 raise the transfer bars 209, 211 and the block 207 to the position shown in full lines in FIG. 12. When the piston rod 253 is moved toward the right, the arm 245 moves clockwise and allows the transfer bars 209, 211 and the block 207 to lower under their own weight so that the parts occupy the position shown in dot-dash lines in FIG. 12.

In practice, the piston rod 253 is reciprocated in timed relation with oscillation of the transfer arm 201 so that during the forward or transfer stroke of the transfer arm 201, the transfer block 207 and the transfer bars 209, 211 are raised as shown in full lines in FIG. 12. During this stroke, the transfer bars 209, 211, which may be provided with suitable workpiece or pallet-engaging lug means (not shown) effect transfer of the workpiece or workpieces (not shown) from one work station to the next in the manner heretofore described. On the return stroke of the transfer arm 201, the transfer bars 209, 211 and the transfer block 207 are lowered and move clear of the workpieces or pallets.

Only one pivoted arm 245 has been illustrated here. However, it is to be understood that in some instances, it is desirable to provide two or more such arms 245 spaced along the length of the transfer bars 209, 211 to adequately distribute and support the weight borne thereby. Similarly, one hydraulic motor 252 and piston rod 253 may be used, or several may, in some instances, be necessary. In any event, the operation of the motor or motors 252 is synchronized with movement of the transfer arm 201 so as to effect the transfer sequence described above. The particular control and actuator means for effecting this sequence have not been illustrated here since they are within the realm of the skilled engineer and will be described further with reference to the overall control circuitry.

A secondary transfer arm 261 is positioned adjacent the primary transfer arm 201 and is pivotally mounted at one end on the machine frame by a pivot pin 263 located within a bracket 265 fixed to a stand 266 (FIG. 11) seated on the frame extension 216. A pair of positioning blocks 268 are secured by screws 270 to the frame extension 216 and each has a set screw 272 threadedly received therein to engage one end of the stand 266. The other end of the stand 266 abuts a pair of keys 274 which are seated in slots 276 in the frame extension 216 and are secured by screws 278. Similarly, a positioning block 280 is secured to the frame extension 216 and has a set screw 282 positioned to engage one side of the stand 266. The other side of the stand 266 engages a key 284 seated in the slot 286 and secured by screws 288. Thus, by replacing the keys 274 with differently sized keys and adjusting the set screws 272, the position of the stand 266 is adjusted longitudinally on the frame extension 216 and by replacing the key 286 and adjusting the set screw 282, the position of the stand 266 is adjusted laterally.

An adjustable link 267 is pivotally connected at one end by a pivot pin 269 to the secondary transfer arm 261 and at its other end by a pivot pin 271 to the primary transfer arm 201. The secondary transfer arm 261 has a generally cylindrical outer end 273 pivotally and slidably received in a transfer block 275 similar to the block 207. Thus, the block 275 has a pair of segmental cylindrical bearings 277, 279 secured therein which receive a generally cylindrical member 281. The cylindrical outer end 273 of the transfer arm 261 extends slidably through the cylindrical member 281 so that oscillation of the secondary transfer arm 261 causes the transfer block 279 to move linearly along and between the guide rails 215, 217. The block 279 has one or more antifriction rollers 283 which engage the guide rail 217 and slidably engages the guide rail 215 and has a pair of transfer bars 285, 287 secured thereto by screws 289 so that linear movement of the transfer block 275 causes the transfer bars 285, 287 also to move linearly.

Like the block 207 and the transfer bars 209, 211, the block 275 and the transfer bars 285, 287 are supported for controlled, vertical movement between the guide rails 215, 217 by one or more pivoted arms 289 having antifriction rollers 290 substantially identical to the pivoted arm 245 seen in FIG. 14. A hydraulic motor 291, similar to the motor 252, has a controllably reciprocated piston rod 293 pivoted to the arm 289 by a pin 294 in substantially the same fashion as the piston rod 253 and the arm 245 to move the housing 275 and the transfer bars 285, 287 vertically in timed relation with oscillatory movement of the secondary transfer arm 261.

In the device shown, the link 267 interconnects the transfer arms 201, 261 substantially midway between the pivots 203, 125 and 263, 281. Because of the geometry of these parts, the block 275 and the transfer bars 285, 287 move only half as far in a lineal direction as the block 207 and the transfer bars 209, 211. The result is then that workpieces fed by the transfer bars 285, 287 move only half the distance as workpieces fed by the transfer bars 209, 211. Thus, by this arrangement, a single drive and transmission effects different workpiece indexing through different machine stations and the particular arrangement illustrated is used effectively in the example briefly set out above. It will be apparent, however, that the relative lineal movement of the blocks 207 and 275 and the transfer bars 209, 211 and 285, 287 can be varied simply by constructing the transfer arms 201, 261 to receive the pivot pins 271, 269 at different appropriate positions thereon and/or by adjusting the positions of the stands 200, 266 laterally on the frame extension 216. In addition, the positions which define the oscillating stroke limits of the transfer arms 201, 261 are adjusted by appropriate adjustment of the turnbuckle 121, a turnbuckle 291 on the link 267 and/or adjustment of the stands 200, 266 longitudinally on the frame extension 216 as described above.

If it be necessary that the transfer bars 209, 211 and/or the transfer bars 285, 287 feed workpieces handled thereby through the machine work stations in cycles of less than once for each complete stroke of the transfer arms 201, 261, it is only necessary that the pivot arms 245, 289 associated therewith be cycled accordingly. For example, in the illustrated embodiment, the transfer bars 209, 211 desirably are raised into a feeding position, as illustrated in full lines in FIG. 12, once for each two cycles of the transfer arm 201 while the transfer bars 285, 287 are raised for each cycle of the transfer arm 261. Thus, the machine controls are constructed to pivot the arm 245 once every two cycles and the arm 289 serving the transfer bars 285, 287 once ever cycle.

Figure 15:
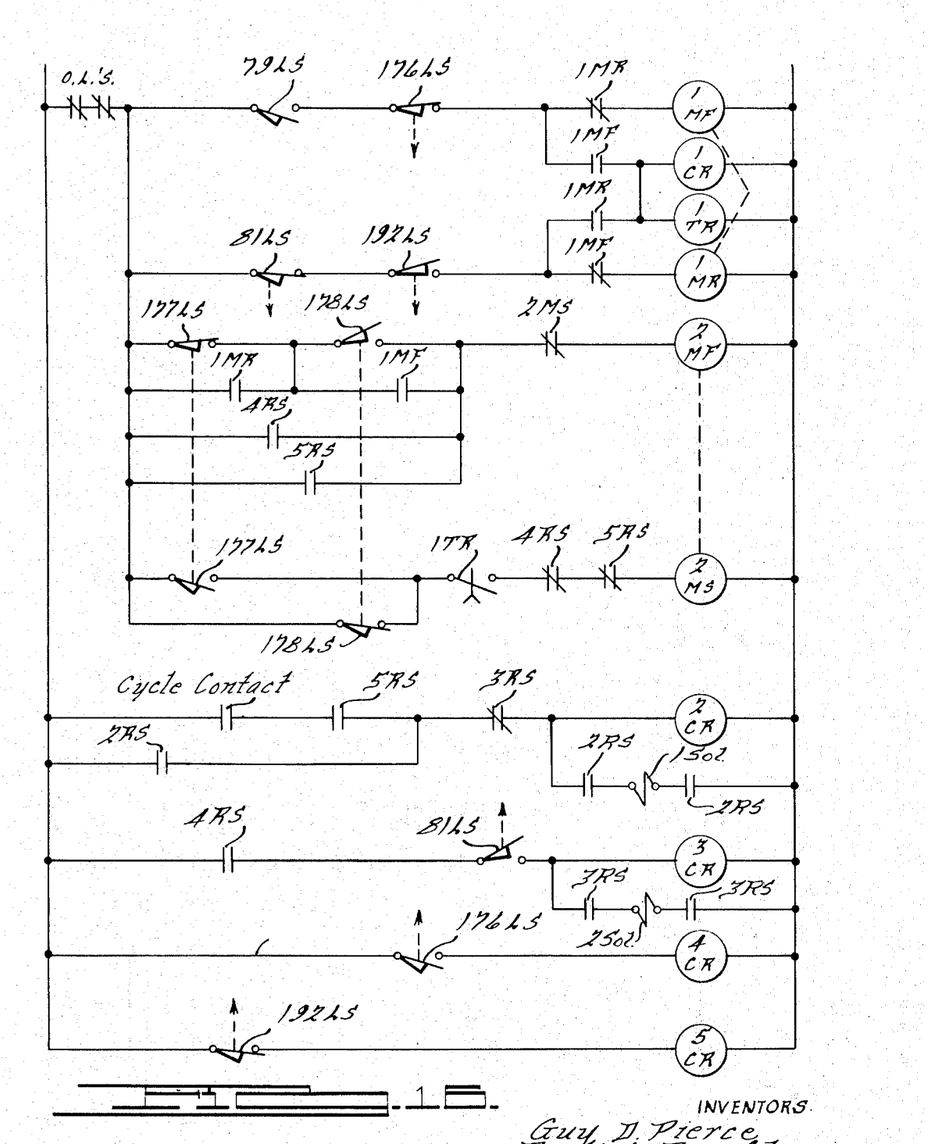
FIG. 15 is a flow diagram illustrating a typical sequence of stations in which the transfer mechanism of FIGS. 11–14 may be employed.

In one type of machine in which a dual transfer device of this type is particularly suitable, the secondary transfer arm 261 and its associated transfer bars 285, 287 are used to index workpieces one at a time through successive stations in one part of the machine shown as stations A and B in FIG. 15 while the primary transfer arm 201 and its associated transfer bars 209, 211 index the same workpieces, two at a time, through longer stations in another part of the machine shown as stations C and D in the figure. Thus, the transfer bars 285, 287 index workpieces on every cycle of the crank 117 until the leading workpiece reaches the station B which is the last station served by these transfer bars and which preferably is an idle station. This workpiece in place at the idle station B trips a switch 295 thereat causing the motor 252 to shift the piston rod 253 to the left as seen in FIG. 14 thereby pivoting the arm 245 in a counterclockwise direction raising the transfer bars 209, 211. On this cycle of the crank 117, then, the transfer arm 201 and transfer bars 209, 211 index the workpiece on the idle station B and the workpiece in the last work station A served by the transfer bars 285, 287, into the first machine work station C served by the transfer bars 209, 211.

On the next cycle of the crank 117, no workpiece is in place at the idle station B and therefore the transfer block 207 and the transfer bars 209, 211 remain in the lowered inactive position illustrated in dot-dash lines in FIG. 12 while the transfer bars 285, 287 index a workpiece into its last work station A and one into the idle station B. On the succeeding cycle of the crank 117, the workpiece at the idle station B again trips the part in place switch 295 rendering the transfer bars 209, 211 active and the transfer sequence is continued. During this transfer cycle, the workpieces at station C are transferred to station D and the workpieces at stations A and B are transferred to station C by the transfer bars 209, 211.

The operation of the device of FIGS. 11–15 is basically the same as that described for FIGS. 1–10 above but is modified to achieve workpiece indexing from right to left as seen in FIG. 11 and to accomodate sequencing of the dual transfer mechanism. Thus, after the machine has been turned "on," the drive motor 85 causes the crank arm 117 to turn, the transfer arms 201, 261 to oscillate and therefore the transfer blocks 207, 275 to reciprocate. The transfer bars 209, 211 and the blocks 207, 275 are raised and lowered in the desired sequence as described above, and in timed relation with oscillation of the transfer arms 201, 261. Initially, the high speed winding of the drive motor 85 is energized and turning movement of the crank 117 away from the initial position illustrated in FIG. 11 is quite rapid. However, when the crank 117 approaches the dead-center position 180° from the position illustrated in FIG. 11, the cam plate 171 engages the arm 175 of switch 177 and switches the motor 85 to the low speed winding thereby reducing the turning speed of the crank 117. When the crank 117 reaches this deadcenter position, the pin 191 engages an air switch 192 to shut off the motor 85 and apply the brake 100 which stops the transfer arms 201, 261 and accurately positions the workpieces fed by the transfer bars 209, 211 and 285, 287. Thereafter, the motor 85 is reversed as is the turning movement of the crank 117 along with the direction of swinging movement of the transfer arms 201, 261. The motor 85 being on the high speed winding rapidly swings the transfer arms 201, 261 back until the cam plate 185 engages and pivots the switch arm 189 of switch 178. This switches the motor 85 on to the low speed winding and when the pin 179 engages an air switch 176, the motor 85 stops and the brake 100 is again applied.

Figure 17:
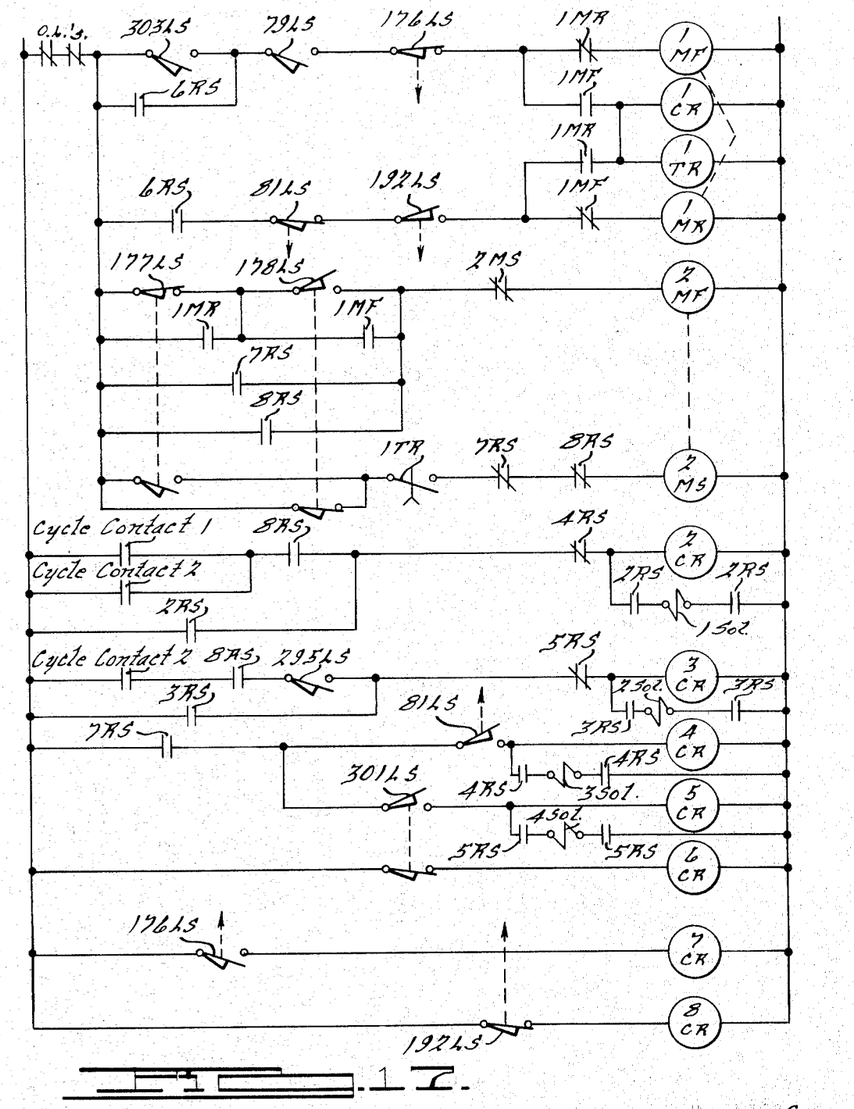
FIG. 17 is a schematic wiring diagram illustrating the controls for the embodiment of the invention disclosed in FIGS. 11–15.

FIGS. 17 and 18 schematically illustrate one form of the electrical and motor control system adapted to effect sequencing of the transfer mechanism controls disclosed in the embodiment of the present invention disclosed in FIGS. 11–15 and are shown with the parts in the position illustrated in FIG. 11.

The system is turned on by closing the cycle contact 1 which can be done by either manually operating a push button or automatically in response to completion of one of the machining or other operations of the device as described above, which, in turn, energizes the relay 2CR through the contacts of relay switches 8RS and 4RS. The contact relay 2CR closes the contact relay switches 2RS energizing 1 solenoid to shift a valve (not shown) controlling the directional flow of fluid to the hydraulic motor 291 to raise the block 275 and the transfer bars 285, 287. When the arm 289 begins moving counterclockwise and the block 275 and the transfer bars 285, 287 begin moving upwardly, a V-shaped trip arm 295 fixed for movement with the arm 289 releases the arm 77 of gang switch 81 and upon completion of this upward movement, the trip arm 295 engages the arm 75 of switch 79 so that now the high speed starter 1MF is actuated. This energizes the high speed windings of the drive motor 85 and in addition energizes the timer 1TR along with the relay 1CR which effects release of the brake 100. Thus, the transfer bars 285, 287 along with the transfer bars 209, 211 start moving forwardly through the transfer stroke under the influence of the high speed windings of motor 85. At this point, however, only the transfer bars 285, 287 are in the raised position while the transfer bars 209, 211 remain in the lowered inactive position.

Substantially immediately after the motor 85 is energized, the pin 191 moves away from the air limit switch 192 and releases it to effect deenergization of the relay 8CR. Continued movement of the transfer arms 201, 261 under the influence of the motor 83 causes the cam 185 to move out of contact with the switch arm 189 and releases the gang switch 178 and a short time later the timer 1TR times out. The transfer arms 201, 261 continue moving in a forward direction, with the transfer bars 285, 287 effecting a short feed of the workpieces through the stations as illustrated by A, B in FIG. 15, while the transfer bars 209, 211 are in their lower, inactive position. When the transfer arms 201, 261 approach the forward limit of the transfer stroke, the cam 171 engages and pivots the switch arm 175 tripping the gang switch 177, which deenergizes the high speed windings of the motor 83 by deenergizing the high speed starter 2MF and energizes the slow speed windings of the motor 83 through the slow speed starter 2MS to slow the rate of movement of the transfer arms 201, 261 and their associated transfer bars 209, 211 and 285, 287, respectively, in the forward direction. The transfer arms 201, 261 continue moving until the gang air switch 176 is tripped by the pin 179 thereby deenergizing the starter 1MF, timer 1TR and the relay 1CR. This then effects deenergization of the slow speed windings of the drive motor 83 and through the contact relay 1CR, the brake 100 is set and movement of the transfer arms 201, 261 is stopped. In addition, the switch 176 energizes the relay 7CR opening the relay switch 7RS to deenergize the slow speed starter 2MS and energize the fast starter 2MF to prepare the circuit for the return stroke.

When the contact relay 7CR is energized, it closes the relay switch 7RS as described, and since the gang switch 81 has already been released, this effects energization of the relay 4CR. When this occurs, the relay switches 4RS are closed and energize 3 solenoid to effect reversal of the valve controlling the directional flow of fluid to the hydraulic motor 291 effecting raising and lowering of the block 275 and the transfer bars 285, 287. This causes the block 275 and the transfer bars 285, 287 to be lowered and therefore disengaged from the workpiece supporting pallets whereupon the switch arm 77 of the gang switch 81 is tripped and the contact relay 4CR deenergized. At this point, 295LS, which is the part in place switch located at the work station B, is tripped as a part has been moved into this station during the previously described transfer stroke.

When the gang switch 81 is tripped, it energizes the transfer return starter 1MR. 1MR energizes the high speed windings of the drive motor 85 in reverse polarity and in addition energizes the timer 1TR and the brake release relay 1CR, thereby causing the transfer arms 201, 261 to move in the reverse direction at high speed. As soon as the transfer arm 201 starts moving, the gang air switch 176 is released and a short time later, the cam 171 moves out of contact with the switch arm 175 of the gang switch 177 to release it and a short time later, the timer 1TR times out. The transfer arms 201, 261 continue moving rearwardly as do their associated transfer bars 209, 211 and 285, 287, respectively, and as these parts approach the initial position illustrated in FIG. 11, the switch arm 189 of the gang switch 178 is engaged and tripped by the cam 185 to effect deenergization of the high speed starter 2MF and energize the slow speed windings of the motor 85 through the starter 2MS. When the transfer arms 201, 261 reach the fully returned position as shown in the figure, the gang air switch 192 is tripped to effect deenergization of return starter 1MR, the timer 1TR and the relay 1CR which in turn deenergizes the slow speed windings of the motor 85 and sets the brake 100. The air switch 192 also energizes the relay 8CR and deenergizes the slow speed starter 2MS and at the same time energizes the fast starter 2MF to prepare the circuit for the next cycle.

Since the part in place switch 295LS has been tripped, the cycle contact 2 is operated and energizes the relay 2CR together with the relay 3CR through the contacts of 295LS, 5RS and 8RS. This causes the relay switches 2RS and 3RS to close and energize 1 solenoid and 2 solenoid which effect reversal of the valves controlling the directional flow of fluid to the motors 252, 291 which effect raising of the blocks 207, 275 as well as their associated transfer bars 209, 211 and 285, 287, respectively. Thus, both of the sets of transfer arms 285, 287 and 209, 211 are raised at this time so that they each will effect feeding of workpieces during the following cycle. As the transfer bars 285, 287 move upwardly, 81LS is released as is a switch 301LS engaged by a V-shaped trip arm 302 fixed for angular movement with the arm 245 and when the part at station B is lifted from the station, 295LS is released. When both sets of transfer bars 285, 287 and 209, 211 are fully raised, 79LS and 303LS are tripped. 79LS and 303LS energize the starter 1MF and the transfer cycle progresses as described above except that at this time both sets of transfer bars 285, 287 and 209, 211 are raised and effect transfer of workpieces.

When the transfer arms 201, 261 reach the fully forward position, the air switch 176 is tripped to energize the relay 7CR and therefore the relays 4CR and 5CR. This causes the relay switches 4RS and 5RS to close thereby energizing 3 solenoid and 4 solenoid to effect reversal of the valves which control the directional flow of fluid to the motors 252, 291 which lowers the transfer bars 209, 211 and 285, 287. When both sets of transfer bars are lowered, the switches 303LS and 79LS are released. When the transfer bars 285, 287 are fully lowered, the switch 81LS is tripped which effects deenergization of the relay 4CR. When the transfer bars 209, 211 are fully lowered, the switch 301LS is tripped causing deenergization of the relay 5CR and energizing the relay 6CR; 81LS and 6CR therefore energize the starter 1MR to begin the return stroke of the transfer arms 201, 261 as described above. When these transfer arms 201, 261 are fully returned, the circuit is ready to begin recycling, as described above.

By the foregoing, there has been disclosed an improved, extremely simple and highly efficient and accurate workpiece mechanical transfer mechanism, and while preferred embodiments of the present invention have been illustrated and described above in detail, various additions, substitutions, modifications and omissions may be made thereto without departing from the spirit of the invention as encompassed by the appended claims.

What is claimed is:
1. A mechanical transfer mechanism comprising,
   arm means pivotably mounted at one end for movement about a first axis,
   crank means for selectively pivoting said arm means,
   transfer bar means slidably disposed for longitudinal reciprocating movement relative to said first axis and adapted to transfer workpieces associated therewith in one longitudinal direction of movement,
   means pivotably and slidably interconnecting said arm means and said transfer bar means,
   means including multi-speed drive means connected to said crank means and having rotatable output means for biasing said bar means at a preselected speed for a predetermined portion of the operational cycle of the mechanism and at a different preselected speed for another portion of said cycle, and
   means for controlling said drive means in response to positioning of said arm means to reduce the speed of said drive means after a predetermined angular movement of said output means less than 180° and to stop said drive means after a predetermined angular movement of said output means substantially equal to 180°,
   whereby said transfer bar means is reciprocated in a manner wherein during each cycle, the workpieces are transferred at a relatively fast rate and are thereafter transferred at a relatively slow rate in order to minimize momentum of movement of the workpieces and provide for accurate positioning thereof at the end of each of said cycles.

2. A device as claimed in claim 1 which includes brake means for said output means operable in response to positioning of said arm means to stop said output means substantially simultaneously with stopping of said motor.

3. A device as claimed in claim 1 wherein said control means is adjustable.

4. A device as claimed in claim 1 wherein said motor is reversible and wherein said control means effects reversal of the polarity of said motor after each 180° rotation of said output means.

5. A mechanical transfer mechanism comprising,
   a pair of arms,
   means supporting said arms for pivotal movement about spaced parallel pivotal axes,
   crank means interconnected with one of said arms,
   link means interconnecting said arms for conjoint pivotal movement,
   transfer bar means slidably disposed for longitudinal reciprocating movement relative to said first axis and adapted to transfer workpieces associated therewith in one longitudinal direction of movement,
   means pivotably and slidably interconnecting said arm means and said transfer bar means, and
   means including multi-speed rotatable drive means for biasing said bar means at a preselected speed for a predetermined portion of the operational cycle of the mechanism and at a different preselected speed for another portion of said cycle, whereby said transfer bar means is reciprocated in a manner wherein during each cycle, the workpieces are transferred at a relatively fast rate and are thereafter transferred at a relatively slow rate in order to minimize momentum of movement of the workpieces and provide for accurate positioning thereof at the end of each of said cycles.

6. A device as claimed in claim 5 wherein said transfer bar means includes a pair of transfer bars, each of which is pivotally and slidably interconnected with a respective one of said arms.

7. A device as claimed in claim 6 wherein said link means is longitudinally adjustable.

8. A device as claimed in claim 6 wherein said link means is pivotally connected to said arms at positions thereon spaced differently from said parallel axes.

9. A device as claimed in claim 8 wherein said link means and its connection to said arms effects movement of one of said transfer bars twice the distance the other transfer bar moves.

10. A device as claimed in claim 6 wherein each of said transfer bar means is independently supported for movement to and from transferring relation with said workpieces.

11. A device as claimed in claim 10 which includes means for moving each of said transfer bar means to and from said transferring relation, said last-mentioned means being operable in response to positioning of one of said arm means to move one of said transfer bar means into said transferring relation and in response to positioning of said one arm means together with positioning of one of said workpieces to move the other of said transfer bar means into said transferring relation.

12. A device as claimed in claim 10 wherein each of said transfer bar means is supported for translation to and from transferring relation with said workpieces.

13. A device as claimed in claim 5 wherein said pivotal mountings for each of said arms is adjustable in a direction normal to the directional movement of said transfer bar means.

References Cited

UNITED STATES PATENTS

| | | | |
|---|---|---|---|
| 1,700,710 | 1/1929 | Rich | 198—226 |
| 2,281,603 | 5/1942 | Shoup | 70—40 |
| 2,571,153 | 9/1951 | Mercier | 70—40 |
| 2,808,746 | 10/1957 | Blomquist | 198—221 |
| 2,926,774 | 3/1960 | Oppermann | 198—221 |
| 3,059,760 | 10/1962 | Rusling | 198—224 |
| 3,301,374 | 1/1967 | Proctor | 198—221 |

RICHARD E. AEGERTER, *Primary Examiner.*

EVON C. BLUNK, *Examiner.*